United States Patent Office 3,095,768
Patented July 2, 1963

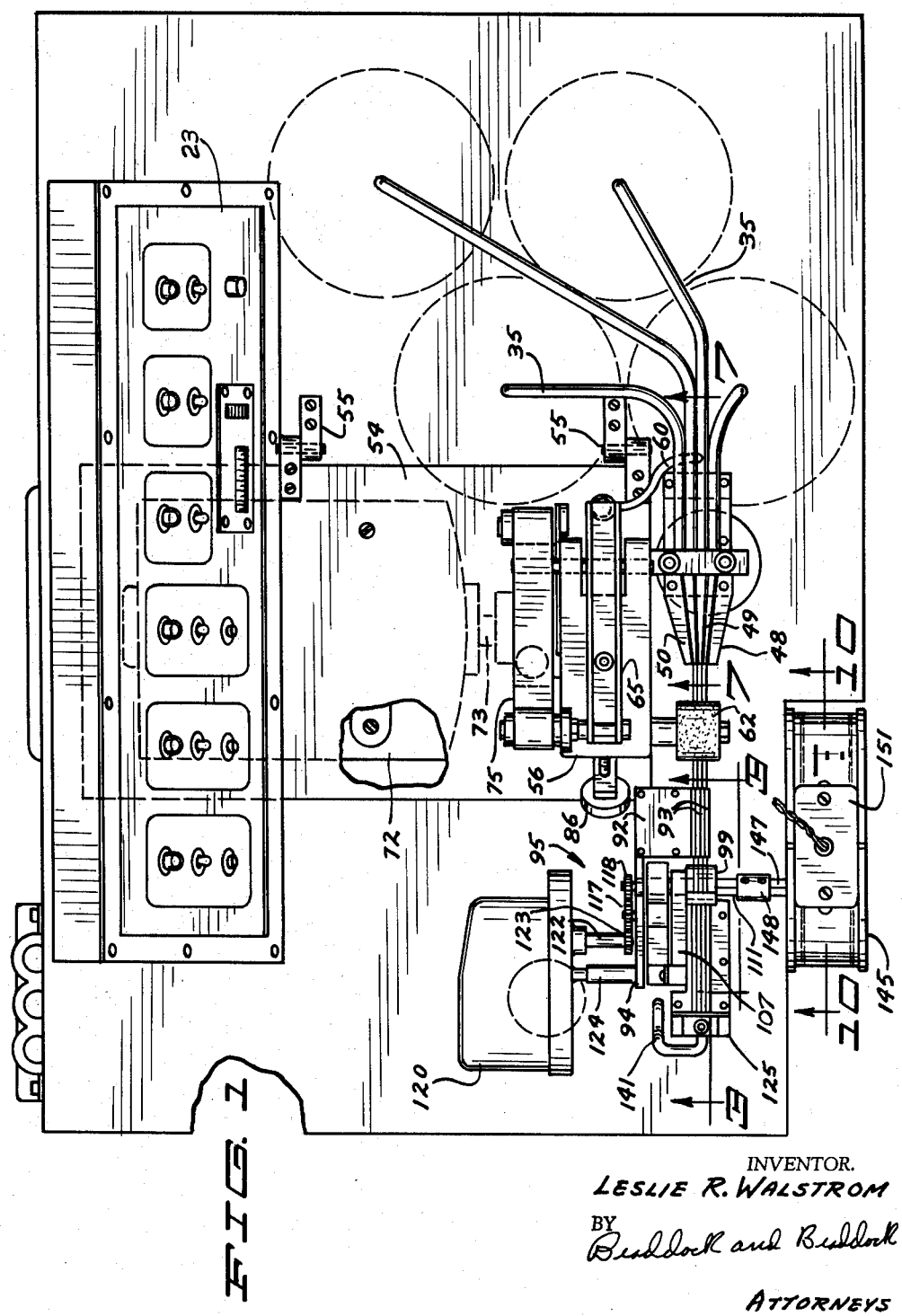

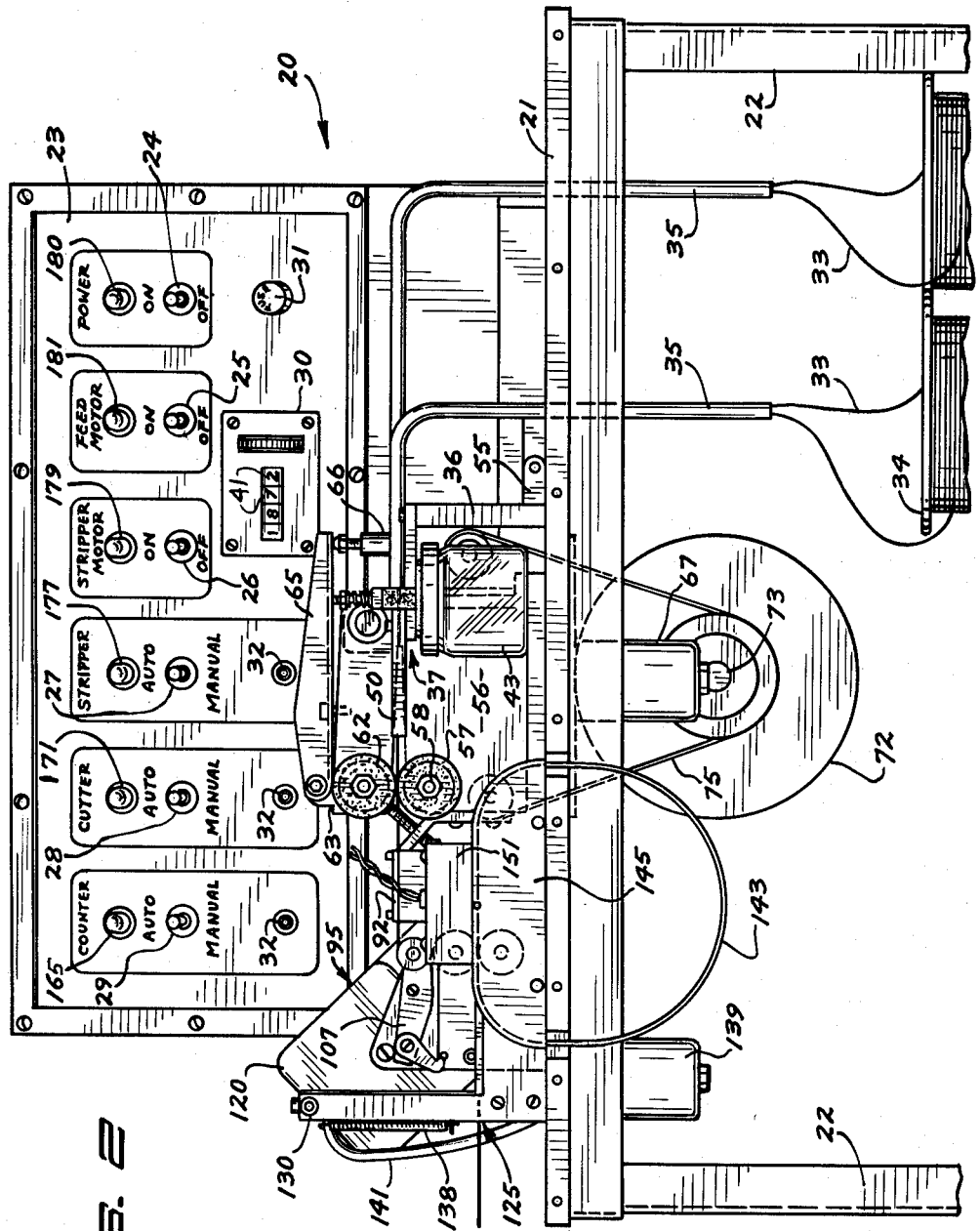

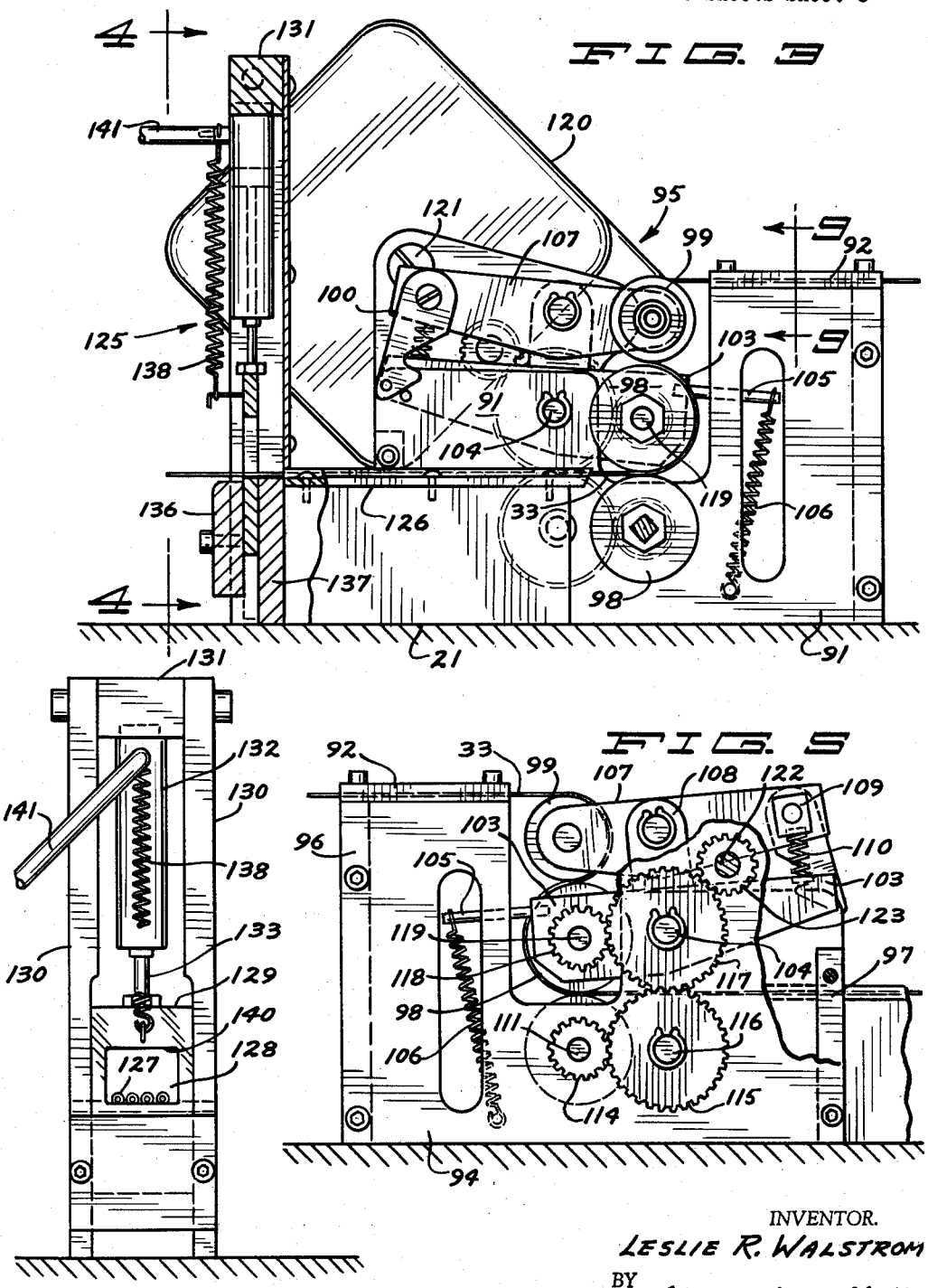

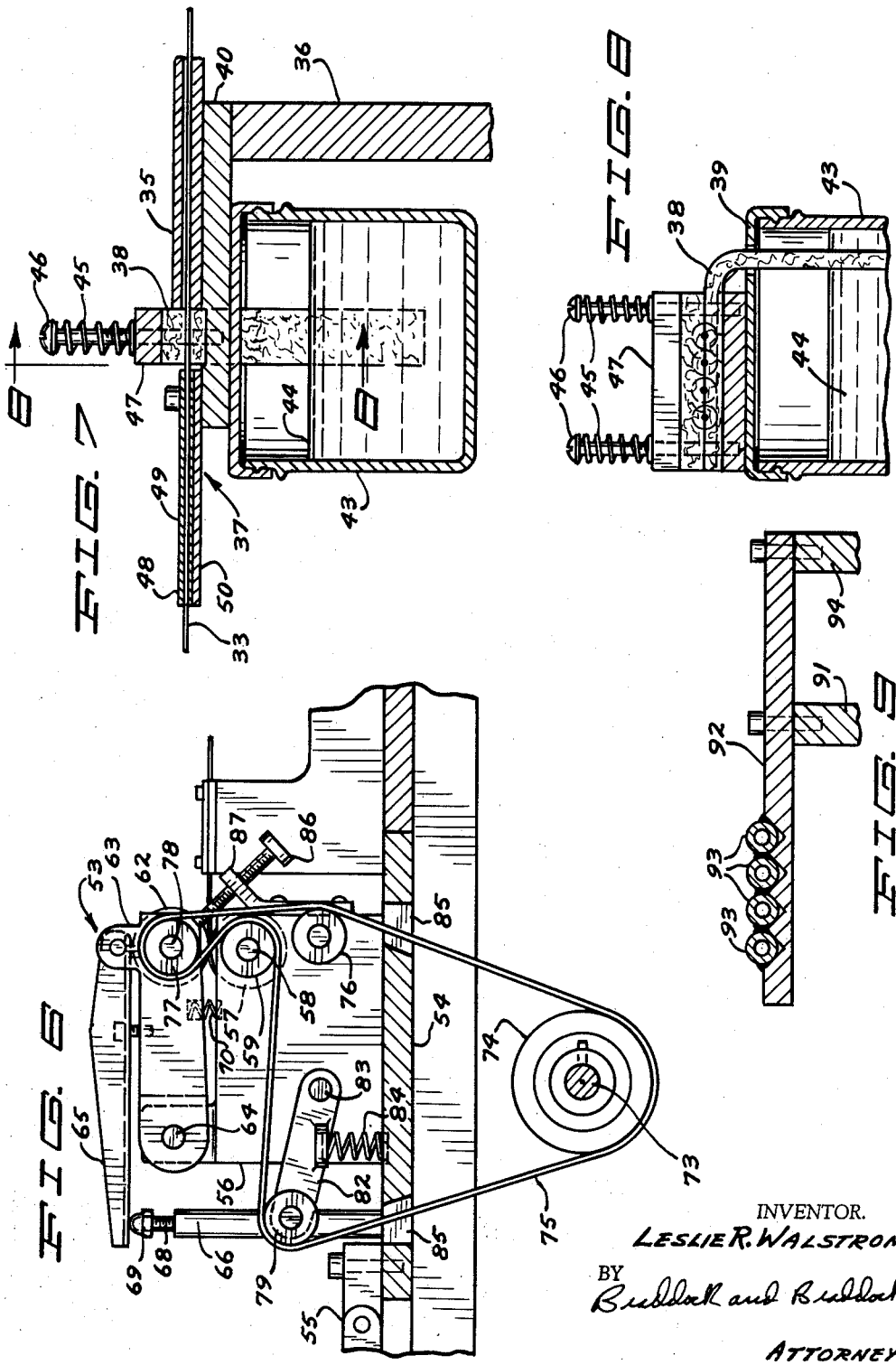

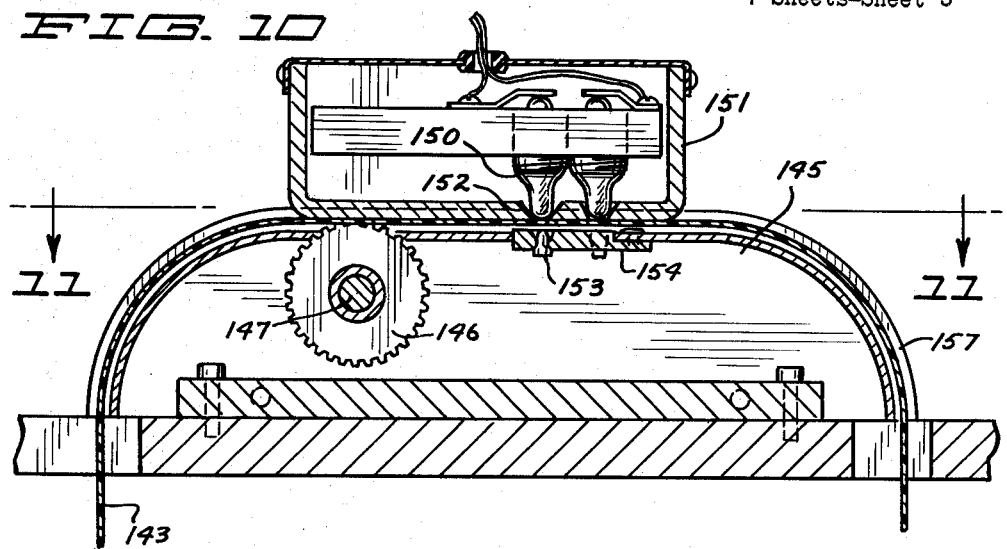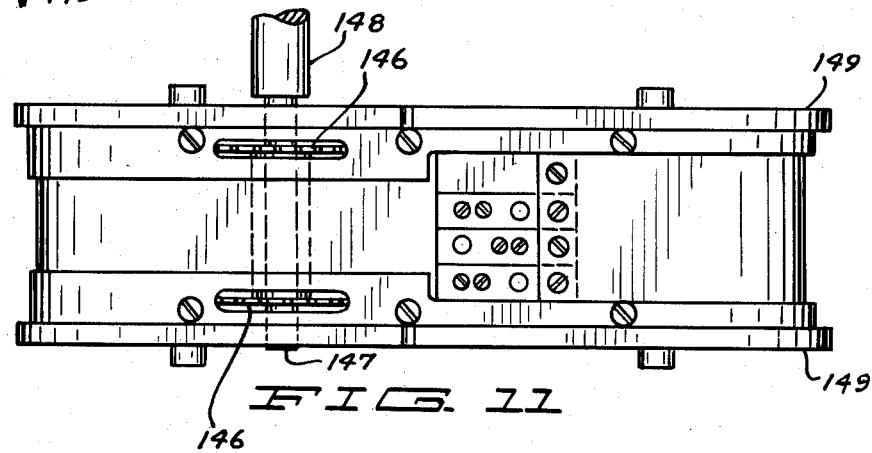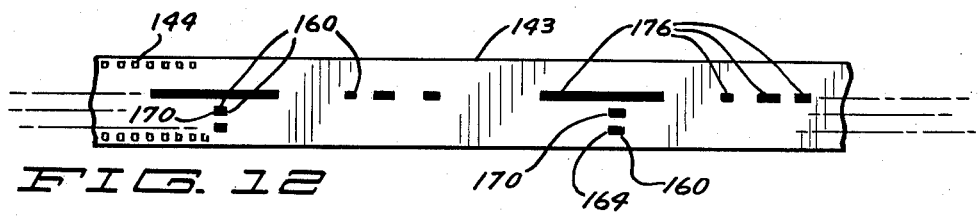

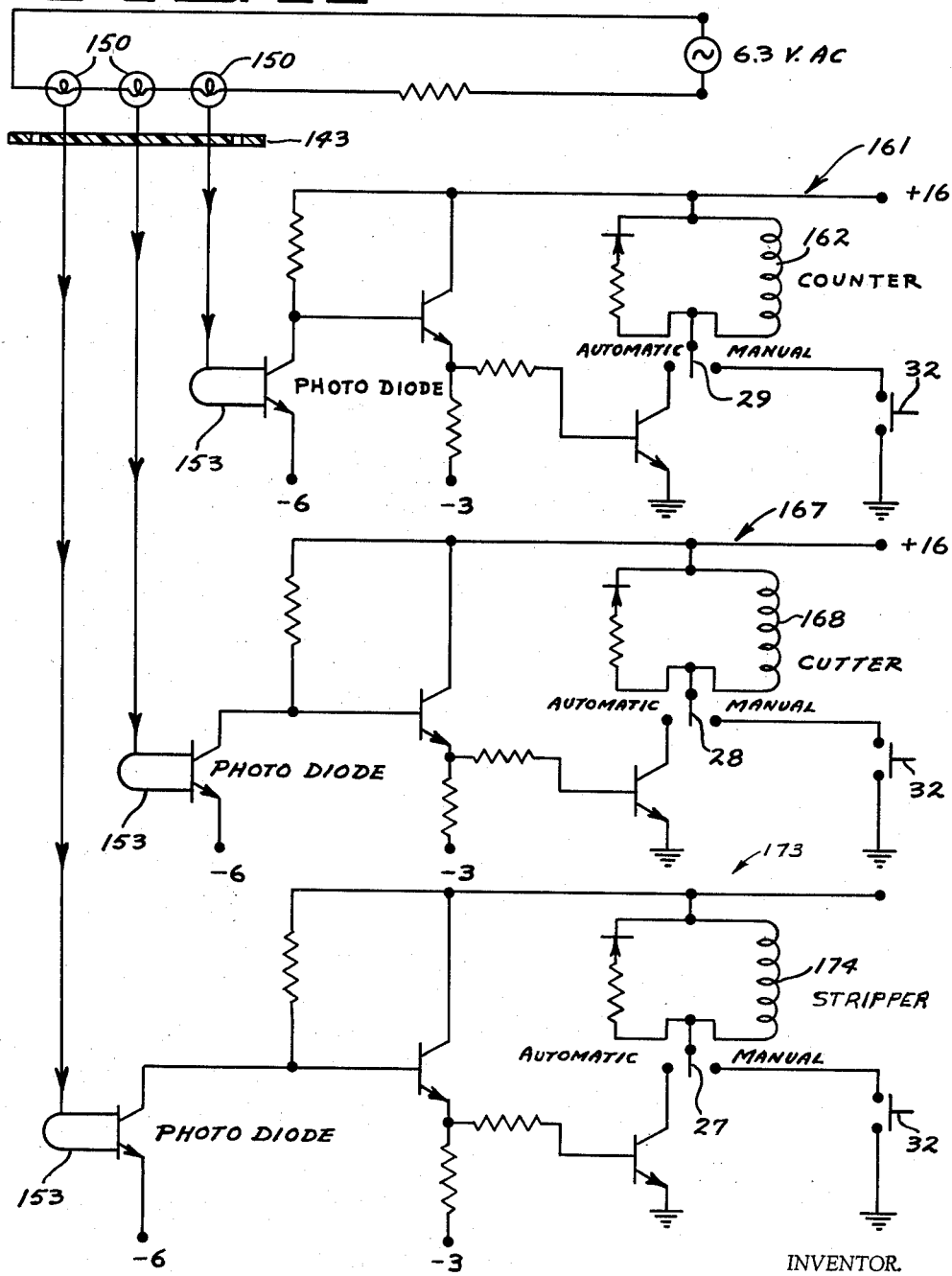

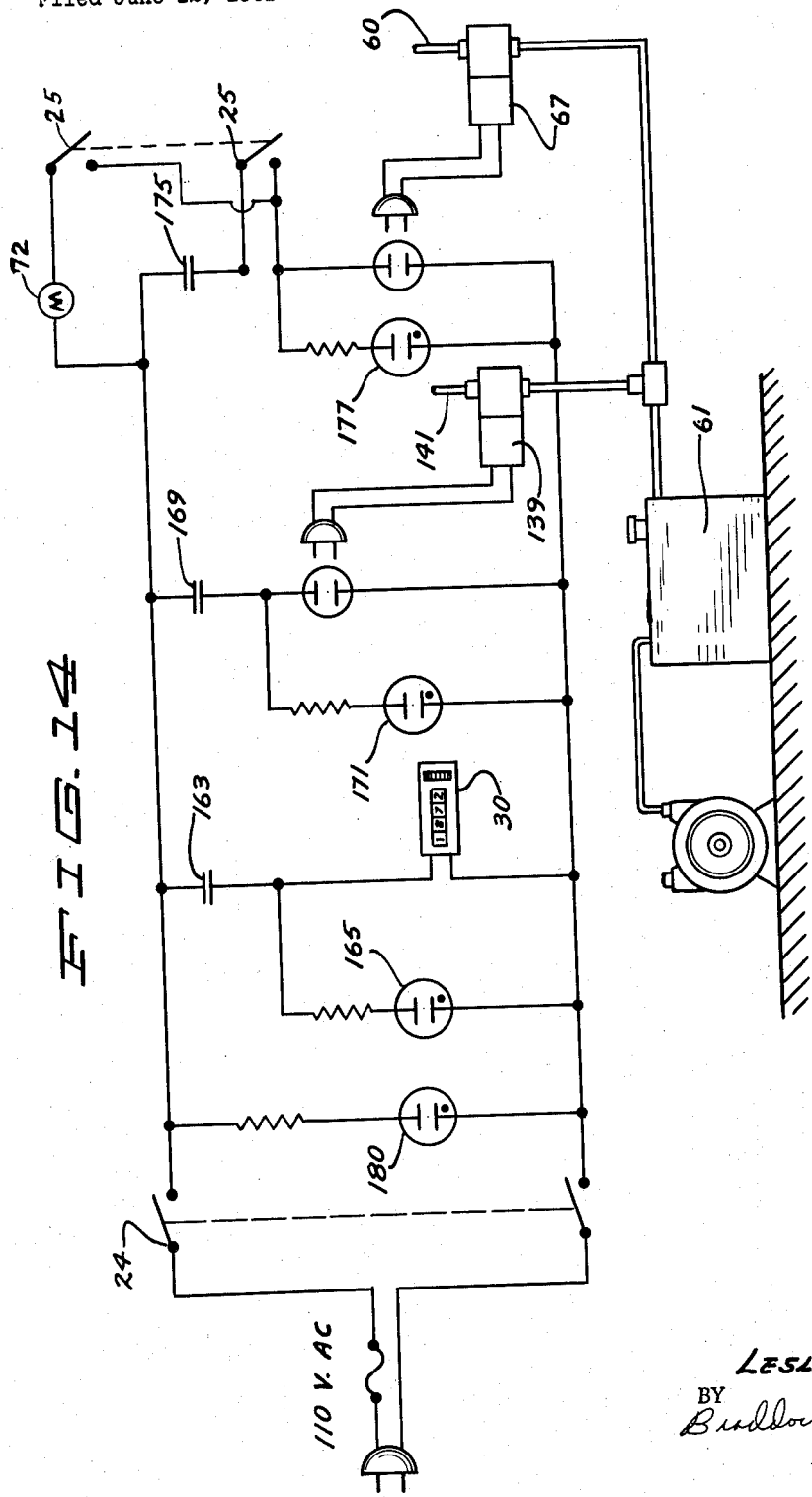

3,095,768
AUTOMATIC WIRE STRIPPING DEVICE
Leslie R. Walstrom, Amery, Wis., assignor to Fabri-Tek Incorporated, Hopkins, Minn., a corporation of Wisconsin
Filed June 12, 1961, Ser. No. 116,473
10 Claims. (Cl. 81—9.51)

This invention has relation to a device for stripping enamel or other similar insulation from electrical wires and more particularly to a device capable of simultaneously stripping a plurality of wires according to a predetermined pattern, capable of cutting wires to predetermined lengths, and capable of performing these functions manually or automatically.

Methods and devices presently in use for stripping small gauge enameled wire do not provide for stripping a plurality of wires at the same time, do not provide for automatic means to strip a predetermined length of wire, and do not provide for efficient means to measure and cut the wire to desired lengths. It is presently standard practice to chemically remove the insulation from such wires. This is a time consuming, entirely manual operation. The ends of the wires that are desired to be stripped are dipped into a chemical that will react with the insulation covering of the wire and remove it. This involves the danger that the solvent will reach portions of the wire which must remain insulated.

The present invention discloses a device that will automatically strip, measure, cut, and count a plurality of electric wires and will repeat these operations automatically. In the form of the present invention as shown, spools holding wires are placed beneath a table and tubular conduits are extended downwardly to these spools. The wires pass through the conduits up to a guide block that positions the wires to pass between and to be engaged by two stripping wheels which rotate to remove the insulation from the wires. One of the wheels is swingably mounted for movement toward and away from the other to allow the wires passing between the wheels to be stripped of insulation or not depending on the position of the wheels.

Before the wires enter the wheels for stripping a solvent is applied to them to remove any traces of oil from the wires. A wire drive assembly is positioned to pull the wires through the conduits and between the grinding wheels and to push them across a guillotine type cutting block that is actuated by an air cylinder to cut the wires to the desired length. When ever a wire is cut, a counter is activated to tally the pieces of wire processed.

The entire operation of stripping, counting and cutting is controlled by a transparent or translucent master tape. A plurality of light bulbs are positioned to project light through the tape on to a plurality of photosensitive diodes, with one of the diodes controlling each of the operations of the automatic wire stripper. When a particular operation is to be instituted and mechanism is to be actuated, the proper light is blocked out by an opaque portion of the master tape. This causes the photosensitive diode to bias an electric control circuit in a manner to cause it to operate to cause the actuating mechanism to perform its desired function.

The master tape is prepared in advance to cause any of the desired operations to be performed at any predetermined place on the wire. Tolerances within plus or minus 0.002 inch per inch of length are being maintained consistently on wires being stripped on a machine made according to the invention. These limits are being maintained as to the length of the stripped areas, the length of insulated wire between stripped areas, and the total overall wire length. The machine is extremely rapid in operation and a machine as shown in the present form of the invention processes each strand of wire at a rate of 53 inches per minute. This machine has the capacity to handle up to four wires simultaneously and, therefore, processes a total of 212 inches of wire per minute.

In the drawings,

FIG. 1 is a top plan view of a wire stripping device made according to the present invention;

FIG. 2 is a side elevational view of the device of FIG. 1;

FIG. 3 is an enlarged sectional view taken as on line 3—3 in FIG. 1;

FIG. 4 is a view taken substantially as on line 4—4 in FIG. 3;

FIG. 5 is a fragmentary rear elevational view of that portion of the device shown in FIG. 3;

FIG. 6 is a fragmentary enlarged rear elevational view of a drive mechanism for stripping wheels made according to the present invention;

FIG. 7 is an enlarged sectional view taken substantially as on line 7—7 of FIG. 1;

FIG. 8 is a sectional view taken as on line 8—8 in FIG. 7;

FIG. 9 is a sectional view taken as on line 9—9 in FIG. 5;

FIG. 10 is a sectional view taken as on line 10—10 in FIG. 1;

FIG. 11 is a top plan view taken substantially as on line 11—11 in FIG. 10;

FIG. 12 is a top plan view of a master tape used for controlling the operations of the device made according to the present invention;

FIG. 13 is a schematic representation of an electrical control power circuit of the invention; and FIG. 14 is a schematic representation of an electrical circuit for controlling said power circuit.

Referring to the drawings and numerals of reference thereon, an automatic wire stripping device indicated generally at 20 includes a support table 21 supported by a plurality of legs 22 and has a control panel 23 supported on top of the table. Control panel 23 includes the following switches: a double pole, single throw main power on/off switch 24; a double pole, single throw feed motor on/off switch 25; a stripper motor on/off switch 26; a double pole, single throw automatic to manual stripper switch 27; a double pole, single throw automatic to manual cutter switch 28; a double pole, single throw automatic to manual counter switch 29; and separate stripper, cutter and counter manual momentary contact switches 32. In addition control panel 23 has a counting device 30 and a fuse 31 mounted thereon.

A plurality of spools 34 having wires 33 wound thereon are placed on provided spindles below the level of the table top. Each of the wires 33 is threaded through a provided tube 35 that is associated with one of the respective spools and extends upwardly through the table top 21 and is supported on a support block 36.

*Wire Cleaning Device*

As best seen in FIGS. 1, 2, 7 and 8, a wire cleaning assembly 37 is positioned at the terminal end of the tube 35 and includes a two portion wick 38 that is positioned to allow the wires 33 to pass between said portions. A lower portion of wick 38 extends downwardly through a cover 39 that is fixedly attached to cover support 40 extending outwardly from support block 36. The cover 39 threadably supports a jar 43 which contains a suitable solvent 44, for example, denatured alcohol. A pair of springs 45, 45 mounted on screws 46, 46 resiliently urge a pressure block 47 down onto an upper portion of the wick 38 so that the wick is held in intimate contact with the wires and so that all portions of the wires are completely cleaned. The solvent is carried up through the wick by capillary action.

A first wire guide 48 is fixedly positioned to cover support 40 and has a plurality of tubes 49 attached to a guide plate 50. The tubes 49 converge in the direction of travel of the wire as it goes through the wire stripping machine. The ends of the tubes 49 position the wire properly for entry into a stripping device 53.

Wire Stripping Device

As best seen in FIGS. 1, 2, 6 and 13, the wire stripping device 53 is mounted on a separate board 54 that is pivotally mounted to the table 21 by a pair of hinges 55, 55. A stripping device main frame block 56 is fixedly attached to board 54 and serves as a support for other components of the stripping device. A lower stripping or grinding wheel 57 is rotatably mounted with respect to frame block 56 on a shaft 58 that extends through the block and has a belt pulley 59 drivingly attached thereto. An upper grinding or stripping wheel 62 is rotatably mounted on an arm 63 that in turn is pivotally attached, as at 64, to frame block 56. A lever 65 is adjustably mounted on the arm 63. A cylinder 66 is operated by a solenoid valve 67 that controls the flow of air through conduit 60 from a source of pressure 61 to the cylinder. The cylinder 66 has a longitudinally slidable piston rod with an actuator button 69 on one end thereof. Coil spring 70 is positioned between frame block 56 and arm 63 to normally hold the stripping wheels separated.

The operation of the air cylinder in connection with the wire stripping device will be further explained later when the operation of the entire machine is explained.

A stripper drive motor 72 is fixedly attached to a lower side of the board 54 and has a drive shaft 73 on which a drive pulley 74 is drivably mounted. A belt 75 passes over drive pulley 74 and is driven thereby. Belt 75 is further positioned to pass over an idler pulley 76 on block 56, an upper drive pulley 77 which is drivably attached to a shaft 78 on which upper grinding wheel 62 is mounted, back over belt pulley 59 that is situated to drive lower grinding wheel 57, thence over to a tightener pulley 79 that is rotatably mounted on a tightener arm 82 which in turn is pivotally attached, as at 83, to stripper frame block 56, and back to drive pulley 74. Arm 82 is resiliently urged by a spring 84 in direction to cause tightener pulley 79 to tighten the belt 75 and to keep the belt in driving relationship with the drive pulley 74 and pulleys 59 and 77. The drive belt 75 passes through board 54 through provided holes indicated at 85, 85. The board 54 can be rotated upwardly so that the wheels 62 and 57 will be accessible so they can be dressed or adjusted.

An adjusting screw 86 is threadably mounted through a bracket 87 on the block 56 and extends to engage the lower portions of arm 63 so that the minimum spacing between the grinding wheels 62 and 57 can be precisely adjusted. This insures that the wheels will completely strip insulation from the wires without damaging the conductors themselves.

Wire Feeding Device

A second guide plate 92 fixedly mounted with respect to table 21 is positioned adjacent the stripper unit and has a plurality of tubes 93 each positioned to encompass one of the wires as it leaves the wire stripping device. Guide plate 92 is fixedly attached to two upright walls 91, 94 that are associated with a wire drive assembly indicated generally at 95 and best seen in FIGS. 1, 2, 3, 5, 6 and 9. The wire drive assembly is fixedly attached to table 21 by a frame made of the two previously mentioned walls 91, 94 and two end plates 96 and 97 which extend between the walls 91, 94 and together with those walls, form a box-like structure. The wires 33 are driven through the instrumentality of a pair of pressure or drive rolls 98, 98 and an idler roll 99 which serves to guide the wires as they are driven through the device. A pressure roll pivot arm 103 is pivotally mounted between walls 91, 94 on a shaft 104 that extends between said upright walls. The walls 91 and 94 are identical except that wall 94 has a portion 90 that extends upwardly higher than wall 91.

A spring retaining pin 105 is fixedly attached to the pressure roll pivot arm 103 and has a spring 106 attached between it and a rod extending between the upright walls 91, 94. Spring 106 resiliently urges the pressure rolls 98, 98 together and provides for driving contact between the wires and the rolls.

The idler roll 99 is mounted on an idler pivot arm 107 which is pivotally attached to an ear 108 on pressure roll pivot arm 103. A spring clip 109 is fixedly attached to idler pivot arm 107 and a spring 110 is positioned between spring clip 109 and pressure roll pivot arm 103. Spring 110 resiliently urges the idler roll 99 against the upper pressure roller 98. The lower pressure roller 98 is mounted on a shaft 111 which extends through and is rotatably mounted with respect to the upright walls 91, 94. A first pinion 114 is drivingly attached to the shaft 111. Pinion 114 drivingly engages a first gear 115 which is rotatably mounted on a shaft 116 that in turn is mounted between upright walls 91, 94. Gear 115 drivingly engages a second gear 117 that is mounted on a pressure roll pivot shaft 104 and this gear 117 in turn engages a second pinion 118 that is drivingly mounted on a shaft 119 on which the upper pressure roller 98 is drivingly mounted.

A wire drive motor 120 is mounted to the upper portion 90 of the upright wall 94 with a screw 121 and has an output drive shaft 122 that has a pinion 123 drivably mounted thereon that drivingly engages second gear 117 and thus serves to drive the other gears and pinions and the wire drive rollers.

The wires 33 are threaded between the rollers as seen in FIGS. 3 and 5 and the pressure between the rollers serves to permit them to grip the wire and pull it through the stripping wheels and the cleaning mechanism. Feed motor 120 is connected through switch 25 to a suitable source of power. A panel 100 may be positioned on a provided peg 101 to keep the rollers separated to implement threading the wire between the pressure feed rollers.

Wire Cutting Device

A wire cutting device 125, best shown in FIGS. 1, 2, 3 and 4, includes a third guide plate 126 that has a plurality of tubes 127 each of which is positioned to encompass one of the wires 33 that is passing through the machine. Third guide plate 126 is fixedly attached with respect to table 21 and is positioned immediately adjacent the pressure rollers 98, 98. The wires coming from the pressure rollers are fed through tubes 127 of guide plate 126 and the guide plate guides the wires through an opening 128 provided in a cutting plate 129 which is vertically slidable in a frame 130. Frame 130 has a top cross member 131 and a cutting cylinder 132 is fixedly attached to this cross member 131 and extends downwardly therefrom. A piston rod 133 extends from said cylinder and engages cutting plate 129. Cutting plate 129 is slidably fitted between a first cutting block 137 and a cutting plate guide block 136. A return spring 138 is positioned to tend to hold the piston rod 133 in retracted position and to hold cutting plate 129 up so that the wires can pass through opening 128. Cylinder 132 is activated by air under pressure from pressure source 61 and the air flow to the cylinder through conduit 141 is controlled with a solenoid valve 139. When the solenoid valve 139 is activated, by the control system which will be later explained, air is introduced in the cylinder and forces cutting plate 129 downwardly. The wires are cut between a cutting edge 140 of the plate 129 and the cutting block 137.

Counting Device

Counting device or counter 30 is an electrically operated unit. Whenever the proper control is activated provided mechanism in the counter is moved to record a successive number with numeral wheels 41. The device is used to count the strips of wire that have been processed.

Master Tape Mechanism

As best seen in FIGS. 1, 2, 10, 11 and 12, all operations of the wire stripping device are actuated and controlled through the instrumentality of a transparent or translucent master tape 143 which has a plurality of driving holes 144 along the edges thereof and is formed into a continuous belt and placed on a tape drive chassis 145. A pair of tape drive wheels 146, 146 are drivably attached to a shaft 147 that is aligned with, coupled to and driven by shaft 111 of the wire drive assembly through the instrumentality of a coupling 148. The tape is guided by end plates 149 and 150 which form a channel to guide the tape as it is driven by wheels 146. A plurality of light bulbs or lamps 150 are positioned above the tape guide chassis and are held in a mounting bracket 151. Each of the light bulbs is positioned to direct a beam of light downwardly through a provided hole 152 in mounting bracket 151 and through the under lying transparent portions of the tape to strike one of a plurality of photo sensitive diodes 153. The diodes 153 are positioned in mounting blocks 154 that in turn are fixedly attached to tape guide chassis 145 and are each positioned to be below a predetermined longitudinal strip area of the master tape 143. One diode is positioned directly below each of the bulbs and the number of diodes involved will vary with the number of operations that are to be controlled. In the form of the invention as shown, three diodes are employed to control the stripper, cutter and counter.

As seen in FIG. 12, strips 160 of opaque tape are situated along the predetermined strip areas of the light pervious master tape 143 to block the path of light from a particular lamp to its associated photo diode in accordance with a predetermined schedule.

Electrical Control Circuitry and Operation

As best seen in FIGS. 13 and 14, each of the photo diodes 153 is associated with a transistorized electrical control circuit which is set up in such a manner that the presence of light on the photo diode will prevent flow through the coil of a relay to be controlled, and so that removal of light from the diode will permit conduction in the control circuit to the end that the relay coil is energized.

When a particular relay coil is energized, its associated relay contact is closed, and a solenoid is energized to cause one of the functions of the machine to be performed.

Specifically, counter photo diode 153 of a counter control circuit 161 will act, together with the other elements of the circuit, in a conventional manner to prevent flow through counter relay coil 162 as long as light from its associated lamp 150 reaches it. When this light is prevented from reaching the counter diode, current will flow in counter relay coil 162, as seen in FIG. 13, and its associated counter relay contactor 163, as seen in FIG. 14, will close thus energizing the counting device 30 and causing it to be advanced by one unit.

This action will take place whenever an opaque strip of tape, for example strip 164, comes between the lamp 150 and the counter photo diode 153 as the master tape 143 proceeds through the master tape mechanism, and as long as the automatic to manual counter switch 29 is in the "automatic" position.

When this switch 29 is put in the manual position, current to the relay coil 162 can be provided by manually closing the counter momentary contact switch 32. The manual operation will be useful in recording each wire which is stripped and cut by use of the manual stripper and cutter controls and will be particularly useful in checking the proper operation of the mechanical elements of the counter mechanism.

It is to be noted that a neon counter signal lamp 165 has been provided to indicate when the counting device 30 has been activated.

The cutter photo diode 153 of the cutter control circuit 167 is associated with cutter control relay coil 168 seen in FIG. 13, cutter control relay contactor 169 seen in FIG. 14, and cutter solenoid 139 also in FIG. 14 in the same manner as previously described in connection with the counter control circuit 161. In other words the master tape 143 moves through the tape mechanism and a strip of opaque tape thereon, such as the strip 170, blocks the light from cutter diode 153, the cutter solenoid 139 will operate to permit air to flow through conduit 141 to cylinder 132, thus to force piston rod 133 in downward direction to cause the cutting edge 140 of cutting plate 129 to sever the wires 133 passing therebeneath in cooperation with the cutting block 137.

A neon cutter signal 169 indicates operation of the wire cutting device.

In stripper control circuit 173, the stripper photo diode 153 is associated with a stripper control relay coil 174 seen in FIG. 13, and an associated stripper control relay contactor 175 seen in FIG. 14.

Strips of opaque tape such as 176 will be positioned on the master tape 143 so that they will block the access of light to stripper photo diode 153 concurrently with the passage of portions of the wires 33 which are to be stripped between the grinding wheels 57 and 62.

As was the case in the other two control circuits, the stripper control relay coil 174 will not be energized as long as light impinges on the stripper photo diode 153, and when the light is cut off the relay coil will be energized and stripper control relay contactor 175 will close causing stripper solenoid 67 to become activated thus to permit passage of air along conduit 60 to the cylinder 66. This causes the piston rod 68 to force the outer end of lever 65 upwardly thus to cause the upper stripping wheel 62 to be forced downwardly with arm 63 about pivot 64. This will result in the wires 33 being stripped of their insulation.

As soon as the opaque strips 176 clear the stripper diode 153, the relay coil 174 will be de-energized, and the grinding wheels will no longer be forced toward each other, and the wheels will separate under urging of spring 70, thus allowing the wires 33 to pass between the grinding wheels without damage to the insulation thereon.

A neon stripper signal 177 is associated with the stripper solenoid to indicate when this solenoid is activated and the wires are being stripped.

The stripper motor will be controlled by the stripper motor switch 26 in any usual or preferred manner. A stripper motor pilot light 179 indicates when the stripper motor is activated and operating.

A main power pilot light 180 and a feed motor pilot light 181 are associated with the main power switch 24 and the feed motor switch 26 respectively.

What is claimed is:

1. A device for removing insulation from an insulated wire, said device including a base, a stripping unit mounted with respect to said base and having at least one rotatably mounted stripping wheel, power means mounted with respect to said base for rotating said wheel, said wheel being movable between a first position wherein said wheel engages a portion of said insulated wire and is operable to strip insulation therefrom and a second normal position spaced from said wire, means to normally hold said wheel in said second position, drive means mounted with respect to said base to move said insulated wire in a direction along its longitudinal axis through said stripping unit, first actuating means mounted with respect to said base operable to move said stripping wheel to said first stripping position, a wire cutter mounted with respect to said base in position to receive wire from said stripping unit, said wire cutter having a cutting element movable from a position clearing said wire to a first cutting position wherein said element cuts said wire after said wire has moved through said stripping unit, means to normally hold said cutting element in said wire clearing position, second actuating means mounted with respect to said base operable to move said cutting element to said first cutting position; first control means to cause said first actuating means to move said wheel to said first wheel position at predetermined intervals, and second control means to cause said second actuating means to move said cutting element to said first cutting position at predetermined intervals.

2. A device for removing insulation from an insulated wire, said device including a main frame, a stripping unit frame mounted on said main frame, support means attached to said stripping unit frame adapted to support said insulated wire, guide means mounted on said main frame to direct said insulated wire onto said support means, a stripping wheel rotatably mounted with respect to said stripping unit frame, said stripping wheel being movable between a first position adjacent said wire support means and a second position away from said wire support means, stop means operable to adjust the minimum spacing between said stripping wheel and said wire support means when said stripping wheel is in said first position, resilient means for normally holding said stripping wheel in said second position, power means for rotating said stripping wheel, said stripping wheel being operable to strip portions of insulation from said insulated wire when said wheel is in said first position and said wire is supported by said support means, actuating means mounted on said main frame for moving said stripping wheel to said first position, control means operable to cause said actuating means to move said stripping wheel to said first position, and means mounted on said main frame to pull said wire in a direction along its longitudinal axis across said support means.

3. The combination as specified in claim 2 wherein said control means includes a continuous master control member, a signal strip attached to said master control member, and signal responsive means adapted to operate said actuating means responsive to position of said signal strip with respect to said signal responsive means.

4. A device for removing insulation from an insulated wire, said device including a main frame, a stripping unit mounted on said main frame and having at least one rotatably mounted stripping wheel, power means for rotating said wheel, said wheel being movable between a first position wherein said wheel engages a portion of insulated wire positioned in said stripping unit and is operable to strip insulation therefrom and a second position wherein said wheel is spaced from said wire, means to normally hold said wheel in said second position, drive means mounted on said main frame to move said insulated wire in direction along its longitudinal axis through said stripping unit, first actuating means operable to move said stripping wheel to said first stripping position, a wire cutter mounted on said main frame and adapted to receive wire from said unit, said wire cutter having a cutting element movable from a position clearing said wire to a first cutting position wherein said element cuts said wire, means to normally hold said cutting element in said wire clearing position, second actuating means mounted with respect to said main frame operable to move said cutting element to said first cutting position, a counter mounted on said main frame and having counting means movable from a neutral position to a first position, said counting means being adapted to reveal an additional successive number whenever said counting means moves to said first position, means to normally hold said counter in said neutral position, actuating means mounted with respect to said main frame operable to move said counting means to said first position, first control means operable to cause said first actuating means to move said stripping wheel to said first wheel position at first predetermined intervals, second control means operable to cause said second actuating means to move said cutting element to said first cutting position at second predetermined intervals, and third control means operable to cause said third actuating means to move said counting means to said first position at third predetermined intervals.

5. The combination as specified in claim 4 wherein said control means includes a continuous master control element actuated by said drive means to pull said wire through said stripping unit, first, second and third signal strips fixedly attached to said master control element, signal receiving means attached to said master control element for operating said first, second and third actuating means responsive to position of said first, second and third signal strips, respectively, with respect to said signal receiving means.

6. The combination as specified in claim 5 wherein said drive means includes a drive frame, an idler roller rotatably mounted on said frame and adapted to receive said insulated wire after it has passed through said stripping unit, a first drive roller rotatably mounted on said drive frame and positioned adjacent said idler roller, a second drive roller rotatably mounted on said frame adjacent said first drive roller, said first drive roller being adapted to receive said wire from said idler roller and direct it between said first drive roller and said second drive roller, resilient means urging said idler roller toward said first drive roller, said second drive roller thereby exerting a compressive force on wire positioned between the surfaces of adjacent rollers, and means to rotate said first and said second drive rollers in opposite rotational direction to tend to pull said insulated wire through said stripping unit.

7. A device for removing insulation material from an insulated wire, said device including a base, a stripping unit mounted with respect to said base, drive means mounted with respect to said base for moving said insulated wire in a direction along its longitudinal axis through said stripping unit, said stripping unit being movable from a wire clearing position to a first position where it is operative to remove substantially all of the insulation for portions of said wire passing through said stripping unit, means to normally hold said stripping unit in said wire clearing position, first actuating means mounted with respect to said base for holding said stripping unit in said first position, first control means controlling said actuating means to cause said actuating means to hold said stripping unit in said first position at predetermined intervals, a wire cutter mounted with respect to said base in position to receive wire from said stripping unit, said wire cutter having a cutting element movable to and from a wire cutting position, second actuating means mounted with respect to said base for actuating said cutting element, and second control means for causing said second actuating means to move said cutting element to said wire cutting position at predetermined intervals.

8. A device for removing insulation materials from an insulated wire, said device including a base, a stripping unit mounted with respect to said base, a drive frame mounted with respect to said base, an idler roller rotatably mounted on said drive frame and positioned to receive said insulated wire after it has passed through said stripping unit, a first drive roller rotatably mounted on said frame and positioned adjacent said idler roller, a second drive roller mounted on said frame adjacent said first drive roller, said first drive roller being adapted to receive said wire from said idler roller and direct it between said first drive roller and said second drive roller, resilient means urging said idler roller toward said first drive roller and said first drive roller toward said second drive roller thereby exerting a compressive force on wire positioned between the surfaces of adjacent rollers, means mounted with respect to said base to rotate said first and second drive rollers in opposite rotational direction to tend to pull said insulated wire through said stripping unit, said stripping unit being movable from a wire clearing position to a first position wherein it is operative to remove substantially all of the insulation from portions of said wire passing through said unit, means to normally hold said unit in said wire clearing position, actuating means mounted with respect to said base for holding said stripping unit in said first position, and control means controlling said actuating means to cause said actuating means to hold said stripping unit in said first position at predetermined intervals.

9. A device for removing insulation material from an insulated wire, said device including a base; a stripping unit mounted with respect to said base; drive means on said base for moving said insulated wire in a direction along its longitudinal axis through said stripping unit; said stripping unit being movable from a wire clearing position to a first position wherein it is operative to remove substantially all of the insulation from portions of said wire passing through said unit; means to normally hold said unit in said wire clearing position; first actuating means mounted with respect to said base for holding said stripping unit in said first position; first control means controlling said first actuating means to cause said actuating means to hold said stripping unit in said first position at predetermined intervals; a wire cutter mounted with respect to said base in position to receive said wire after it has passed through said stripping unit, said wire cutter including an upright cutter frame, a cutting block fixedly positioned with respect to said cutter frame and adapted to support said insulated wire after it has passed through said stripping unit, a cutting element slidably mounted on said cutter frame, said cutting element being movable from a wire clearing position to a first position wherein said cutting element cooperates with said cutting block to cut said insulated wire supported by said block, and resilient means to normally hold said cutting element in said wire clearing position; cutter actuating means mounted with respect to said base for moving said cutting element to said first cutting position; and cutter control means controlling said actuating means to cause said actuating means to move said cutting element to said first position at predetermined intervals.

10. A wire stripping device for removing insulation from an insulated wire, said device including a base, a stripping unit mounted with respect to said base and having at least one rotatably mounted stripping wheel, control means mounted with respect to said base for rotating said stripping wheel, drive means mounted with respect to said base to move said insulated wire in a direction along its longitudinal axis past said wheel, support means on said stripping unit for supporting said insulated wire, said stripping unit being movable to a first position wherein said insulated wire and said stripping wheel are in engaging relationship, resilient means for normally holding said stripping wheel and said wire separated, an adjustable stop member mounted with respect to said base limiting the engagement of said wire and said wheel, actuating means mounted with respect to said base for moving said stripping unit to said first position, and control means to cause said actuating means to move said stripping unit to said first position at predetermined intervals.

References Cited in the file of this patent
UNITED STATES PATENTS

| | | |
|---|---|---|
| 1,784,298 | Mahan et al. | Dec. 9, 1930 |
| 2,275,563 | Sharlow | Mar. 10, 1942 |
| 2,307,046 | Johnson et al. | Jan. 5, 1943 |
| 2,811,063 | Eubanks | Oct. 29, 1957 |
| 2,880,635 | Harris | Apr. 7, 1959 |
| 2,918,759 | Konazewski et al. | Dec. 29, 1959 |
| 2,929,083 | Davis | Mar. 22, 1960 |
| 2,939,367 | Thomas | June 7, 1960 |
| 2,987,955 | Sassenberg | June 13, 1961 |